(12) United States Patent
Kirkland et al.

(10) Patent No.: US 10,748,365 B2
(45) Date of Patent: Aug. 18, 2020

(54) METHOD AND SYSTEM FOR CONTROLLING A MOVABLE BARRIER

(71) Applicant: GTO Access Systems, LLC, Tallahassee, FL (US)

(72) Inventors: Matthew Kirkland, Cantonment, FL (US); Mark Chiaravalloti, Tallahassee, FL (US)

(73) Assignee: GTO Access Systems, LLC, Tallahassee, FL (US)

( * ) Notice: Subject to any disclaimer, the term of this patent is extended or adjusted under 35 U.S.C. 154(b) by 0 days.

(21) Appl. No.: 16/198,509

(22) Filed: Nov. 21, 2018

(65) Prior Publication Data

US 2019/0164366 A1 May 30, 2019

Related U.S. Application Data

(63) Continuation of application No. 15/424,331, filed on Feb. 3, 2017, now Pat. No. 10,163,284.

(51) Int. Cl.
*G07C 9/28* (2020.01)
*H04W 4/021* (2018.01)
*G07C 9/00* (2020.01)

(52) U.S. Cl.
CPC .......... *G07C 9/28* (2020.01); *G07C 9/00174* (2013.01); *H04W 4/021* (2013.01); *G07C 2009/00357* (2013.01); *G07C 2009/00928* (2013.01); *G07C 2209/64* (2013.01)

(58) Field of Classification Search
CPC combination set(s) only.
See application file for complete search history.

(56) References Cited

U.S. PATENT DOCUMENTS

| | | |
|---|---|---|
| 6,002,332 A | 12/1999 | King |
| 6,271,765 B1 | 8/2001 | King et al. |
| 6,476,732 B1 | 9/2002 | Stephan |
| 6,563,431 B1 | 5/2003 | Miller, Jr. |
| 6,911,898 B2 | 6/2005 | Chung |
| 7,002,312 B2 | 2/2006 | Wojciak, Jr. |
| 7,205,908 B2 | 4/2007 | Tsui et al. |
| 7,269,416 B2 | 9/2007 | Guthrie et al. |
| 7,289,014 B2 | 10/2007 | Mullet et al. |

(Continued)

FOREIGN PATENT DOCUMENTS

WO WO-2016109039 A1 7/2016

OTHER PUBLICATIONS

"U.S. Appl. No. 15/424,331, Advisory Action dated Mar. 16, 2018", 2 pgs.

(Continued)

*Primary Examiner* — Thomas S McCormack

(74) *Attorney, Agent, or Firm* — Schwegman Lundberg & Woessner, P.A.

(57) ABSTRACT

A method and system include monitoring to detect a crossing of a first geographic boundary and monitoring to detect a crossing of a second geographic boundary. When a crossing of the first geographic boundary and a crossing of the second geographic boundary are detected in succession, a first barrier system response is initiated. In some examples, when a crossing of the third geographic boundary and a crossing of the second geographic boundary are detected in succession, a second barrier system response is initiated.

18 Claims, 12 Drawing Sheets

(56) References Cited

U.S. PATENT DOCUMENTS

| | | |
|---|---|---|
| 7,477,147 B2 | 1/2009 | Fitzgibbon |
| 7,778,604 B2 | 8/2010 | Bauman et al. |
| 8,179,229 B2 | 5/2012 | Mullet |
| 8,290,515 B2 | 10/2012 | Staton et al. |
| 8,428,782 B2 | 4/2013 | Imes |
| 8,571,518 B2 | 10/2013 | Imes et al. |
| 8,812,024 B2 | 8/2014 | Obermeyer et al. |
| 8,812,027 B2 | 8/2014 | Obermeyer et al. |
| 9,208,629 B2 | 12/2015 | Saladin et al. |
| 9,230,378 B2 | 1/2016 | Chutorash et al. |
| 9,286,733 B2 | 3/2016 | Muirbrook et al. |
| 9,378,601 B2 | 6/2016 | Ricci |
| 9,398,404 B2 | 7/2016 | Pierce, II |
| 9,560,481 B1 | 1/2017 | Yocam et al. |
| 9,704,320 B2 | 7/2017 | Johnson et al. |
| 10,163,284 B2 | 12/2018 | Kirkland et al. |
| 2004/0254727 A1 | 12/2004 | Ockerse et al. |
| 2005/0206498 A1* | 9/2005 | Tsui .............. G07C 9/00182 340/5.71 |
| 2006/0015233 A1 | 1/2006 | Olsen, III et al. |
| 2006/0099971 A1 | 5/2006 | Staton et al. |
| 2013/0244686 A1 | 9/2013 | Saha et al. |
| 2013/0318217 A1 | 11/2013 | Imes |
| 2014/0211099 A1* | 7/2014 | Saha .................. G05B 1/01 348/734 |
| 2014/0267740 A1 | 9/2014 | Almomani |
| 2014/0309813 A1 | 10/2014 | Ricci |
| 2015/0022365 A1 | 1/2015 | Warren |
| 2015/0228134 A1 | 8/2015 | Tehranchi et al. |
| 2015/0228135 A1 | 8/2015 | Tehranchi et al. |
| 2015/0302730 A1 | 10/2015 | Geerlings |
| 2015/0372832 A1 | 12/2015 | Kortz et al. |
| 2016/0016526 A1 | 1/2016 | Louboutin |
| 2016/0189453 A1 | 6/2016 | Johnson et al. |
| 2016/0189502 A1 | 6/2016 | Johnson et al. |
| 2016/0189503 A1 | 6/2016 | Johnson et al. |
| 2016/0223998 A1 | 8/2016 | Songkakul et al. |
| 2016/0261425 A1 | 9/2016 | Horton et al. |
| 2016/0364979 A1 | 12/2016 | Warren |
| 2017/0033944 A1 | 2/2017 | Nadathur et al. |
| 2017/0101076 A1* | 4/2017 | Krishnan ............... H04W 4/80 |
| 2017/0192402 A1 | 7/2017 | Karp et al. |
| 2018/0225898 A1 | 8/2018 | Kirkland et al. |

OTHER PUBLICATIONS

"U.S. Appl. No. 15/424,331, Examiner Interview Summary dated Oct. 26, 2017", 3 pgs.

"U.S. Appl. No. 15/424,331, Final Office Action dated Dec. 22, 2017", 17 pgs.

"U.S. Appl. No. 15/424,331, Non Final Office Action dated Apr. 5, 2018", 5 pgs.

"U.S. Appl. No. 15/424,331, Non Final Office Action dated Aug. 24, 2017", 13 pgs.

"U.S. Appl. No. 15/424,331, Notice of Allowance dated Aug. 13, 2018", 5 pgs.

"U.S. Appl. No. 15/424,331, Response filed Feb. 21, 2018 to Final Office Action dated Dec. 22, 2017", 17 pgs.

"U.S. Appl. No. 15/424,331, Response filed Jun. 28, 2018 to Non Final Office Action dated Apr. 5, 2018", 12 pgs.

"U.S. Appl. No. 15/424,331, Response filed Nov. 14, 2017 to Non Final Office Action dated Aug. 24, 2017", 12 pgs.

"U.S. Appl. No. 15/424,420, Non Final Office Action dated Sep. 1, 2017", 15 pgs.

"FAQ-GeoFences", VeraMate, a simple,elegant home automation control app for Vera, [Online]. Retrieved from the Internet: <URL: veramate.com, (2015), 2 pgs.

* cited by examiner

METHOD AND SYSTEM FOR CONTROLLING A MOVABLE BARRIER

CLAIM OF PRIORITY

This patent application is a continuation of U.S. patent application Ser. No. 15/424,331, filed Feb. 3, 2017, and is incorporated by reference herein.

BACKGROUND

Barriers can take a variety of forms, such as gates, garage doors, or retractable barriers that protrude or retract from below ground or slide or otherwise move from above or from the side of an opening such as a door, hallway, driveway, or other route of passage.

Barriers can be opened using a variety of methods. A barrier can be simply pushed opened manually. Mechanized barriers can be opened by pressing a control device such as a button or lever that activates a motor or other device. Garages doors and gates can currently be opened via remote control devices that are carried by a person or stored in a car. These devices require a person to be in contact with the physical remote control and to manually press a button to initiate an open or close event.

SUMMARY

This document discusses, among other things, systems and methods to control a system such as a barrier operator system. The inventors have discovered, among other things, that a barrier system response can be controlled by using sensor information to monitor for a series of events, such as detection of crossing of two or more boundaries, and applying rules in combination with boundary crossing information to determine a barrier system response. For example, a barrier such as a door or gate can be automatically controlled by monitoring the location of a mobile device or physical sensor information, or both, detecting multiple boundary crossings, and applying rules to determine whether to initiate a response, e.g. open a gate or turn on a light.

In the subject matter (method, system or device) of Example 1, a barrier control system can be controlled based upon a detected crossing of a first geographic boundary, a second geographic boundary, and a third geographic boundary. Example 1 can include, for example, monitoring to detect a crossing of a first geographic boundary, monitoring to detect a crossing of a second geographic boundary, the second geographic boundary being between the first geographic boundary and the third geographic boundary, and monitoring to detect a crossing of a third geographic boundary. When a crossing of the first geographic boundary and a crossing of the second geographic boundary are detected in succession, a first barrier system response can be initiated. When a crossing of the third geographic boundary and a crossing of the second geographic boundary are detected in succession, a second barrier system response can be initiated.

The geographic boundaries can be defined by a geofence, a connection to a local network (e.g., WiFi or Zigbee), or a physical sensor system such as a motion detection system, a laser or photobeam sensor system, a photocell sensor, a magnetic sensor, or a driveway alarm. A geofence can be determined, for example, from one or more of GPS, cellular signals, and local wireless (e.g., WiFi) signals. Monitoring to detect a crossing of a geographic boundary can include analyzing data from a sensor or other sources. This can include, for example, a mobile device processor analyzing location services information or connection status with a known local network, or activation information from a physical sensor. Initiating a first barrier system response can include turning on a light, opening a barrier, presenting a selectable user interface icon to initiate barrier movement (e.g. open a gate or door.)

In Example 2, the subject matter of Example 1 can include monitoring to detect a crossing of a first geographic boundary includes monitoring to detect when a mobile device crosses a first geofence.

In Example 3, the subject matter of Example 2 can include the monitoring to detect a crossing of a third geographic boundary includes monitoring a connection status between the mobile device and a local wireless signal.

In Example 4, the subject matter of Example 2 or Example 3 can include: the monitoring to detect crossing of a second geographic boundary includes monitoring a physical sensor system and determining whether the physical sensor system satisfies a specified sensor activation criterion, or monitoring location monitoring information from the mobile device and detecting when a mobile device crosses a second geofence. Determining whether the physical sensor system satisfies a specified sensor activation criterion can include, for example, detecting activation of a motion detection system, laser or photo sensor system, magnetic sensor, or other sensor.

In Example 5, any one or any combination of Examples 1-4 can further include changing a location-monitoring feature when the mobile device connects to a known local wireless network. Changing a location-monitoring feature can include, for example, turning off or modifying a GPS feature when a mobile device connects to a known local wireless network. A known wireless network can include a WiFi, Zigbee, or Bluetooth network, for example.

In Example 6, changing a location-monitoring feature includes deactivating or reducing the use of a high fidelity GPS feature when the mobile device connects to a known local wireless network. The Example can further include reactivating high-fidelity GPS when connection to local network is lost.

In Example 7, the subject matter of any one or any combination of Examples 1-6 can include switching from a high-fidelity location monitoring feature to a low-fidelity location monitoring feature when the mobile device crosses a fourth geographic boundary that is beyond the first geographic boundary.

In Example 8, the subject matter of any one or any combination of Examples 1-7 can include activating an armed-for-arrival state when a crossing of the first geographic boundary is detected, and initiating a first barrier response when a crossing of the second boundary is detected when the armed-for-arrival state is active. The subject matter can further include activating an armed-for-departure state when a crossing of the third geographic boundary is detected, and initiating a second barrier response when a crossing of the second boundary is detected when the armed-for-departure state is active. In various examples, the armed-for-arrival state and armed-for-departure state can be set in a mobile device, a remote system (e.g., cloud-based control system), or in a local control system, such as a system local to a barrier operator.

An example of a barrier control system (Example 9) can include a motorized barrier operator and a processor configured to send signals to the motorized barrier operator, the processor executing instructions to receive location information regarding a location of a mobile device, determine from the location information when the mobile device crosses a first geographic boundary or a third geographic boundary, determine when a second geographic boundary is crossed, the second geographic boundary being between the first geographic boundary and the third geographic boundary, when the first geographic boundary and the second geographic boundary are crossed in succession, send a command to the motorized barrier operator to initiate a first response, and when the third geographic boundary and the second geographic boundary are crossed in succession, send a command to the motorized barrier operator initiate a second response. The mobile device can include, for example, a handheld device such as a cellular phone, a watch or other wearable device, a garage door opener or other dedicated barrier control device, or a vehicle or portion thereof. The first response can include, for example, opening the barrier or turning on a light or presenting a selectable icon on a mobile device, and the second response can include closing the barrier, turning off a light, or presenting a selectable icon on a mobile device. In various examples, the processor executing the instructions includes a processor connected or local to the barrier opener system, a processor in a mobile device, a processor on a remote device (e.g. part of a cloud-based control system), or multiple processors working together to execute the instructions.

In Example 10, the subject matter of Example 9 can be configured to receive GPS information regarding the location of the mobile device and one or more of the first geographic boundary, the second geographic boundary, and the third geographic boundary include a geofence.

In Example 11, the subject matter of Example 9 or 10 can further include a barrier controller, the barrier controller being in communication with the motorized barrier operator and the processor, the barrier controller configured to execute a command received from the processor to control the motorized barrier operator.

In Example 12, the subject matter of any one or any combination of Examples 9-11 can further include a physical sensor system, the barrier controller configured to receive activation information from the physical sensor system and convey the activation information to the processor, and wherein the instructions are configured to determine that the second geographic boundary was crossed using information received from the physical sensor system. In an Example, the processor receives information that the sensor system was activated (e.g., triggered) and determines that the activation was likely due to the mobile device, or a user or object (e.g. vehicle) associated with the mobile device, based on recent location, trajectory, speed, or velocity information.

In Example 13, the subject matter of any one or any combination of Examples 9-12, can include instructions configured to detect a crossing of the third geographic boundary by monitoring a connection status between the mobile device and a local wireless signal.

In Example 14, the subject matter of any one or any combination of Examples 9-13, can include instructions configured to change a location-monitoring feature when the mobile device connects to a known local wireless network.

In Example 15, the subject matter of any one or any combination of Examples 9-14 can include instructions that are further configured to switch from a high-fidelity location monitoring feature to a low fidelity location monitoring feature when the mobile device crosses a fourth geographic boundary that is beyond the first geographic boundary.

In Example 16, the subject matter of any one or any combination of Examples 9-15 can be configured such that the processor is a component of the mobile device.

In Example 17, the subject matter of any one or any combination of Examples 9-16 can include instructions configured to activate an armed-for-arrival state when a crossing of the first geographic boundary is detected, and initiate the first barrier response when crossing of the second boundary is detected when the armed-for-arrival state is active. The instructions can further be configured to activate an armed-for-departure state when a crossing of the third geographic boundary is detected, initiate the second barrier response when crossing of the second boundary is detected when the armed-for-departure state is active.

Another example of a barrier control system (Example 18) can include a motorized barrier operator configured to open and close a barrier, and a processor configured to send signals to the motorized barrier operator, the processor executing instructions to receive a notification that a mobile device crossed a first geographic boundary or a third geographic boundary, receive a notification that a second geographic boundary is crossed, the second geographic boundary being between the first geographic boundary and the third geographic boundary, when the first geographic boundary and the second geographic boundary are crossed in succession, send a command to the motorized barrier operator to initiate a first response; and when the third geographic boundary and the second geographic boundary are crossed in succession, send a command to the motorized barrier operator to initiate a second response.

In Example 19, the barrier control system of Example 18 can further include the mobile device, wherein the processor is executing instructions to receive from the mobile device the notification that the mobile device crossed the first geographic boundary or the third geographic boundary.

The subject matter of any one or any combination of claims 1-19 can be captured in a non-transitory computer readable medium comprising instructions that, when executed by one or more processors of a device or system, causes the device or system to perform any operation described above. These can include, for example, (Example 20) computer readable medium can include instructions that cause one or more processors to monitor to detect a crossing of a first geographic boundary, monitor to detect a crossing of a second geographic boundary, the second geographic boundary being between the first geographic boundary and the third geographic boundary, monitor to detect a crossing of a third geographic boundary, when a crossing of the first geographic boundary and a crossing of the second geographic boundary are detected in succession, sending a command to a barrier operator to initiate a first barrier system response, and when a crossing of the third geographic boundary and a crossing of the second geographic boundary are detected in succession, sending a command to the barrier operator to initiate a second barrier system response.

An example (e.g., "Example 21") of subject matter (e.g., a system or apparatus) may optionally combine any portion or combination of any portion of any one or more of Examples 1-20 to include "means for" performing any portion of any one or more of the functions or methods of Examples 1-20, or a "machine-readable medium" (e.g., massed, non-transitory, etc.) including instructions that, when performed by a machine, cause the machine to perform any portion of any one or more of the functions or methods of Examples 1-20.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

Figure 1A:
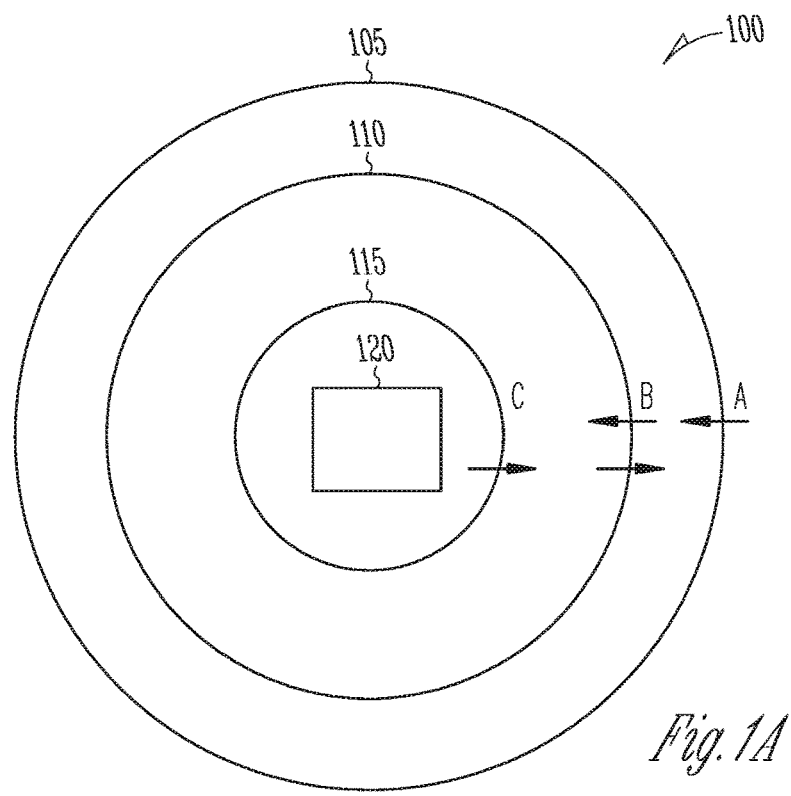
FIGS. 1A-1D are schematic illustrations of a method and system that triggers a barrier response based on detected activity at a specified geographic boundary that is between two other boundaries.

A barrier control system can initiate a barrier system response based upon detection of a series of events, such as a series of two or more detected boundary crossing events. A boundary crossing can be detected, for example, using a physical sensor system such as a laser tripwire or magnetic sensor, or using a connection status or signal strength with respect to a local wireless signal, cellular phone signal or other pervasive wireless signal, or global positioning system (GPS) information. A barrier system response can include, for example, opening or closing a barrier such as a door or gate. Additional responses are also possible, such as controlling a light or lighting system, controlling a lock.

In some examples, a barrier system response can be triggered by crossing two boundaries in succession, optionally in combination with satisfaction of one or more rules. In some examples, a common trigger boundary can trigger an arrival response, and a departure response, conditioned upon first crossing another boundary prior to crossing the common trigger boundary.

In some examples, three or more boundaries are used to drive barrier system response rules, so that a difference sequence of boundary crossings is required to trigger an arrival response than is required to trigger a departure response.

In some examples, a system can automatically initiate garage door or gate actions based on pre-defined rules regarding a user's activity, including the user's location, for example as determined by sensors on a mobile device.

In some examples, satisfaction of one or more additional activation criteria, such as pre-set system rules, are required to trigger a response from a barrier control system. In some examples, the activation criteria include crossing two boundaries in a time period that is less than a threshold. Activation criteria can also include, for example, time of day, e.g. a door will only automatically open or close during certain times of day.

In some examples, the use of location information and rules can make it is easier for a user to enter and secure their environment. For example, a system can be configured so that user is not required to physically interact with a remote control to open or close a door, or so that a prompt is presented on a mobile device such as a smart phone at an appropriate time, such as arrival at or near a destination. The system can leverage the location or speed of a device, supplementary sensors, and pre-set rules to anticipate actions that should be taken.

The use of rules and multiple boundaries can avoid problems presented by an overly simplified system. For example, it would not be sufficient to simply determine if a user's phone connects or disconnects to the home WiFi in order to open or close the door, as that could cause the door to close and open if the user happened to disable and then enable WiFi on her phone while already at home. It would also not be sufficient to simply open the door when the user's GPS-enabled cell phone is within a specified distance of the home, as that could trigger the door if the user is cutting the grass at the edge of the geofence or if the phone's GPS level of accuracy should fluctuate while within the home. However, sensed information such as WiFi connectivity, GPS or other location information, physical sensor activation (e.g. laser or photo beam, magnetic sensor, motion sensor) can be combined, and rules applied, to deduce whether an action (such as opening a barrier) should be initiated.

For example, a method of location detection using multiple geographical boundaries constructed by global position system information, cellular information, WiFi connectivity. These boundaries can act as zones of detection wherein predefined device responses may be triggered. The various responses may be triggered as based on rules applied to the GPS or other information including, but not limited to, movement speed, velocity, acceleration, directional information, and coordinate position within the geographical boundaries. In some examples, a stationary WiFi signal transmitting device can be used in combination with a mobile WiFi signal receiving device as a trigger when a specified WiFi connection is detected and certain rules (e.g. geographic location history or directionality, or geofence boundary crossing sequence,) are satisfied. In other examples, a physical sensor (e.g. laser or photo beam, magnetic sensor, motion sensor) can be used as a trigger for the response, when certain rules are satisfied. In an example, a signal (e.g., detection) from a physical sensor can be sent through a local wireless network, or via remote network, to a processor that also monitors the location of a mobile device and executes rules based on sensor activation and mobile device location.

In an example, when approaching a destination (i.e. pending arrival), crossing one boundary can wake up (i.e. activate) a device or algorithm, and crossing a second boundary can trigger an action such as opening a door or other barrier, unlocking a facility, or turning on a light. In other words, the first boundary causes the device or algorithm "wake up" and start looking for the second boundary, and an action is triggered when the second boundary is crossed. On departure, crossing a third boundary can causes a wake-up event, and crossing the second boundary can be a trigger for a second responsive action.

FIG. 1A is a schematic illustration 100 that includes a first boundary 105, a second boundary 110, a third boundary 115, and a building or destination 120 within the third boundary. The boundaries can be defined, for example, by a physical sensor system, a connection to a wireless system such as WiFi or Zigbee, or a geofence determined from one or more of a GPS signal, a cellular signal, or a local wireless signal or connection. A physical sensor system can include, for example, a motion detection system, a laser or photobeam sensor system, a photocell sensor, a magnetic sensor, or a driveway alarm.

A boundary crossing can be detected using one or more sensor systems. In an example, a mobile device having one or more a GPS sensor circuit, a cellular circuit, a wireless circuit (e.g. WiFi or Zigbee) can detect information from a GPS system, a cellular system, or a local wireless system. A processor (e.g. a processor on the mobile device, or on a remote system (e.g. a cloud-based server) or on a system local to the barrier) can receive information from the device or about the location or connection status of the device, and can detect a boundary crossing by comparing a determined device location to one or more of the geographic boundaries 105, 110, 115. In various examples, a mobile device can include a handheld device or body worn device such as a mobile phone or watch, a dedicated barrier opener, or a vehicle that contains sensors as described above. In some examples, a boundary crossing can also or alternatively be detected from activation of a physical sensor system, or connection to a wireless system, such as connecting to a WiFi network when arriving at a destination.

In an example, a boundary crossing at location A across the first boundary 105 is detected using a geofence, and a boundary crossing at location B across the second boundary 110 is detected using a physical sensor system, and a boundary crossing at location C across a third boundary is detected using a connection status with a wireless network. The boundaries are drawn as circles for illustration purposes only. The boundaries can be any of a variety of closed or open shapes or irregular boundaries definitions, or determined by physical factors such as the extent of a wireless signal or placement of a sensor or network of sensors. It is also understood that the boundary crossing in some examples can occur at any point on the boundary. In other examples, a boundary crossing leads to an eventual trigger response only when a boundary crossing occurs at a specific location or within a specific virtual gate or other defined area (e.g. at location C.)

Figure 1B:
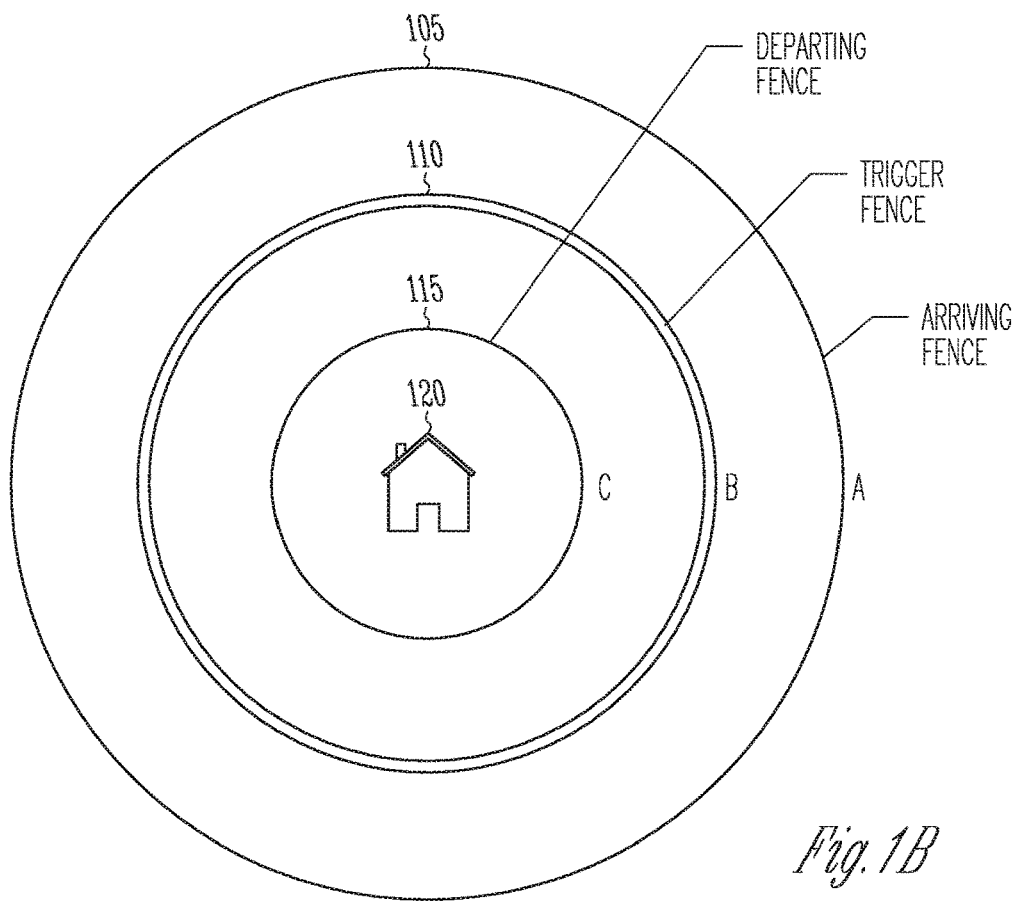

In an example, a barrier system response can be triggered when the second boundary is crossed regardless of the direction of crossing, as long as an activation criterion is satisfied. In an example, a previous crossing of boundary 105 followed by a crossing of boundary 110 triggers a first response, and crossing of boundary 115 followed by crossing of boundary 110 triggers a second response. The first or second barrier system response can be, for example, opening or closing a barrier. Other types of responses are also possible, such as turning on or off a light, or unlocking or locking a door FIG. 1B shows an example where the first boundary 105 is an arriving fence, the second boundary 110 is a trigger fence, and the third boundary 115 is a departing fence near a location such as residence or workplace. The use of a common trigger fence at the second boundary 110 can be desirable for a system user because it provides predictability about the location at which a barrier system response will occur. In other words, the action of opening and closing the door always occurs at the same place (Fence B). In an example, the response is configured to coincide with the end of a driveway or similar location convenient to the user. Another advantage of this approach is that it eliminates the risk of excessive and unwanted door opening and closing if the user is frequently entering or exiting any one of the fences: This is because a user must pass through two fences in order to trigger an event.

Returning to FIG. 1B, when a user moves toward the building 120, a crossing of the arrival fence at boundary 105 is detected, for example based upon the location of a mobile device with respect to a geofence. The crossing of the trigger fence 110 can be detected using the location of the mobile device relative to a geofence, or from connection to a wireless signal, or from a physical sensor system. In an example, an additional activation criteria, such as crossing of the arriving fence 105 and trigger fence 110 occurs within a specified period of time, or at a specified speed, direction, velocity, or path. A barrier system response such as opening of a barrier can occur when the arriving fence 105 and trigger fence 110 occur in succession. At departure, the crossing of the departure fence 115 followed by crossing of the trigger fence 110 causes a barrier system response, such as closing a barrier, shutting off a light, or any other barrier system responses described herein.

Figure 1C:
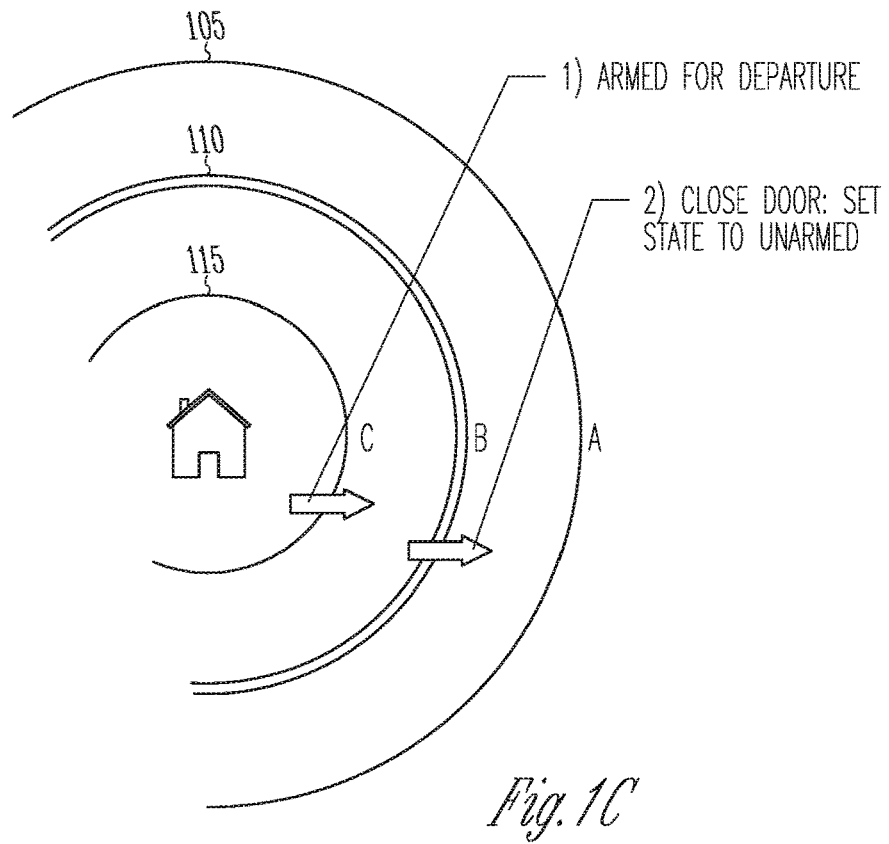
Figure 1D:
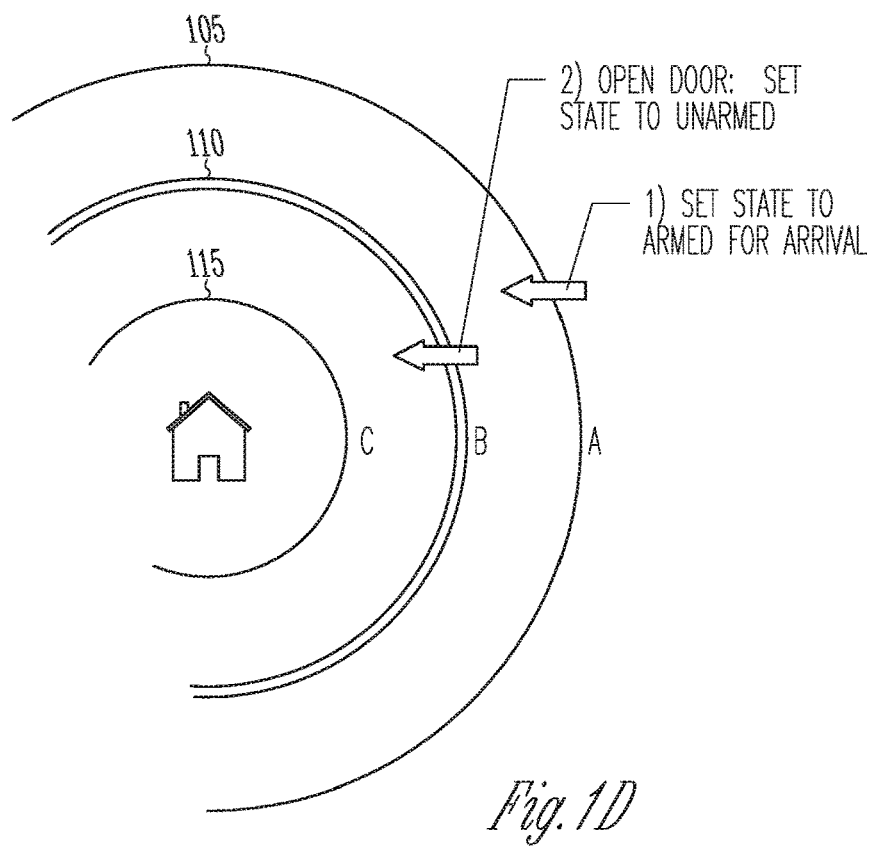

FIGS. 1C and 1D are schematic illustration of state changes that can occur when a boundary is crossed. For example, Fence A can be used to place a mobile device (e.g. a phone) in a mode where its departure from a house or workplace is tracked. Fence "B" can be used to trigger an action related to an automation state, such as opening or closing a door or other barrier. Fence "C" can be used to indicate that the phone is in a mode where its arrival is tracked. In an example, one of three automation states is assigned to a mobile device based on entering or exiting the geofence regions: "Unarmed", "Armed-for-departure", and "Armed for Arrival." In an example configuration, a mobile phone application for Android, iOS, or similar operating system executes logic associated with these geofences. When the application first launches, it can be configured to monitor the three geofence regions. In an example, when the mobile device is determined to be within the third boundary 115 (inner circle, Fence A), the automation state is set to "Armed-for-departure". If the phone is not within the third boundary 115 (inner circle, then state will be "Unarmed".

In an example, with reference to FIG. 1C, when the third boundary 115 is crossed, an armed-for-departure state is activated, i.e. the state is switched from unarmed to armedfor-departure. When a crossing of the second boundary 110 occurs and the armed-for-departure state is active, a barrier system response is initiated. In an example, when the mobile device is set into the armed-for-departure mode, the mobile device monitors for an event to occur, such as loss of a wireless signal, or notification of activation of a physical sensor system via a network or direct wireless connection (e.g. WiFi or Bluetooth or Zigbee or NFC), which can indicate crossing of the second boundary. In another example, a system at the destination or a remote system connected through a network shifts to an armed-for-departure status when the third boundary is crossed, i.e. the state can be tracked by a remote device as opposed to being tracked by the mobile device. When the armed-for-departure state is active, a crossing of the second boundary 110 initiates a barrier system response, such as closing a door or other barrier.

Similarly, in FIG. 1D, when the first boundary 105 is crossed, an armed-for-arrival state can be activated on a mobile device or networked system. The armed-for-arrival state can, for example, include monitoring for crossing of the second boundary, as indicated by activation of a physical sensor system, crossing of a geofence, or connection to a local wireless network. When the second boundary 110 is crossed, a barrier system response can be triggered, such as opening a door or other barrier. In an example, after the second boundary is crossed, on departure, or arrival, or both, the state can be re-set to "unarmed", in which case the system is not monitoring for crossing of the second boundary 110, or crossing of the second boundary does not trigger any barrier system response. This "disarming" of the status can avoid unintended barrier system responses. For example, when the second boundary is crossed multiple times on departure, it may not be desirable to open a barrier that was just recently closed. After disarming, when the third boundary 115 (or first boundary 105, depending on the situation) is later crossed, the state can be reset to armed to enable another barrier system response upon crossing of the second boundary 110.

Figure 2:
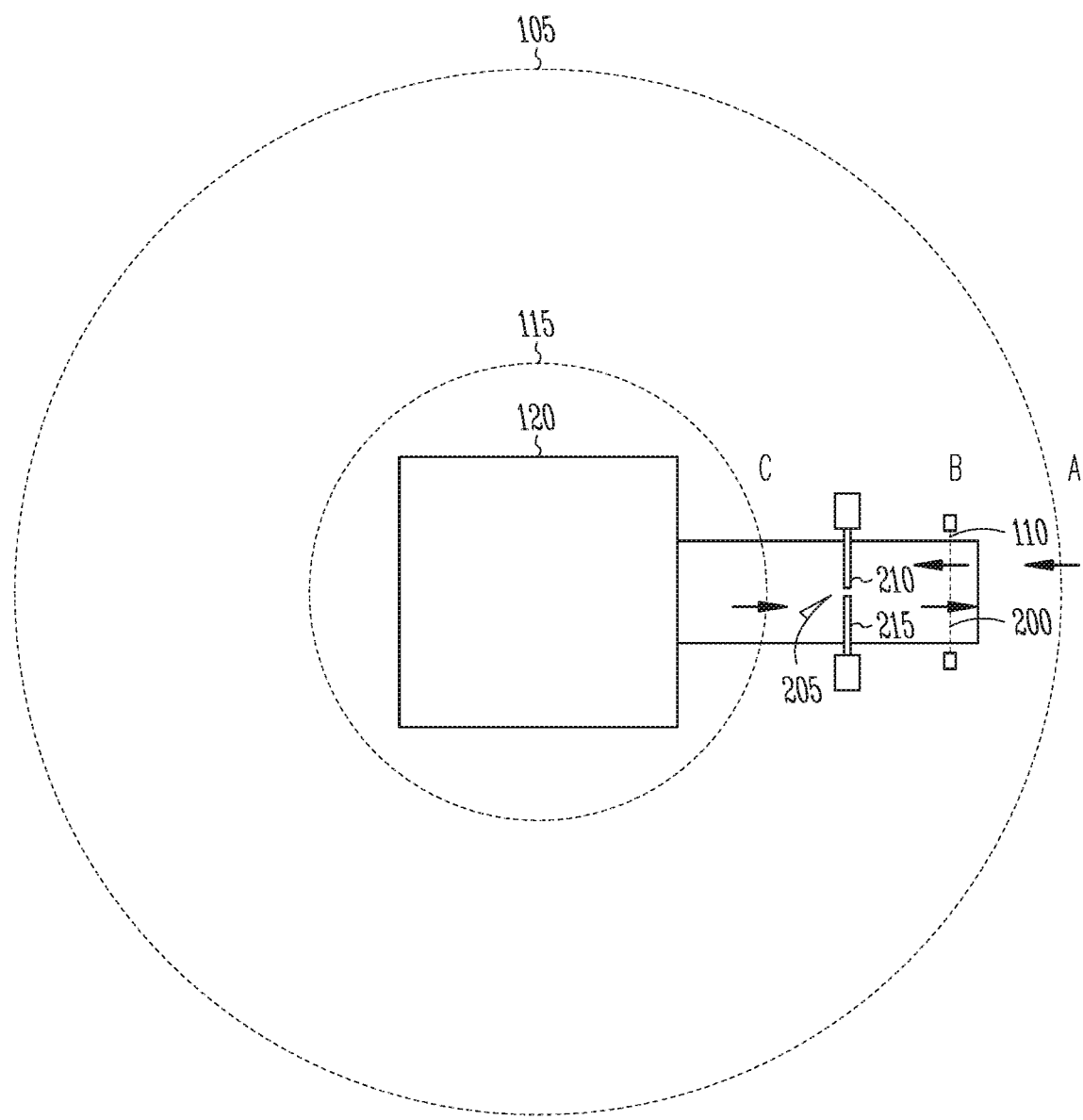
FIG. 2 is a schematic illustration of a method and system that triggers a barrier response based on activation of a physical sensor.

FIG. 2 is a schematic illustration of an example system where the second boundary 110 includes, or is defined by, a physical sensor system 200. In the illustrated example, a boundary 205 is located between the physical sensor system 200 and the building 120. For example, the boundary 205 can be a gate having one or more gate arms 210, 215, which can for example automatically open when a user crosses the first boundary 105 at and then activates the physical sensor 200. In an example, the third boundary 115 can be a local wireless network. In an example, when a mobile device (e.g., phone or vehicle) of a departing user loses connection with the wireless network (or the connection falls below a specified threshold), and then passes through the barrier and past the physical sensor 200, the barrier automatically closes as the user and mobile device depart. In an example, a second physical sensor system (not shown) can be provided inside the barrier 200 to trigger opening of the barrier 200 when the sensor is triggered.

Figure 3:
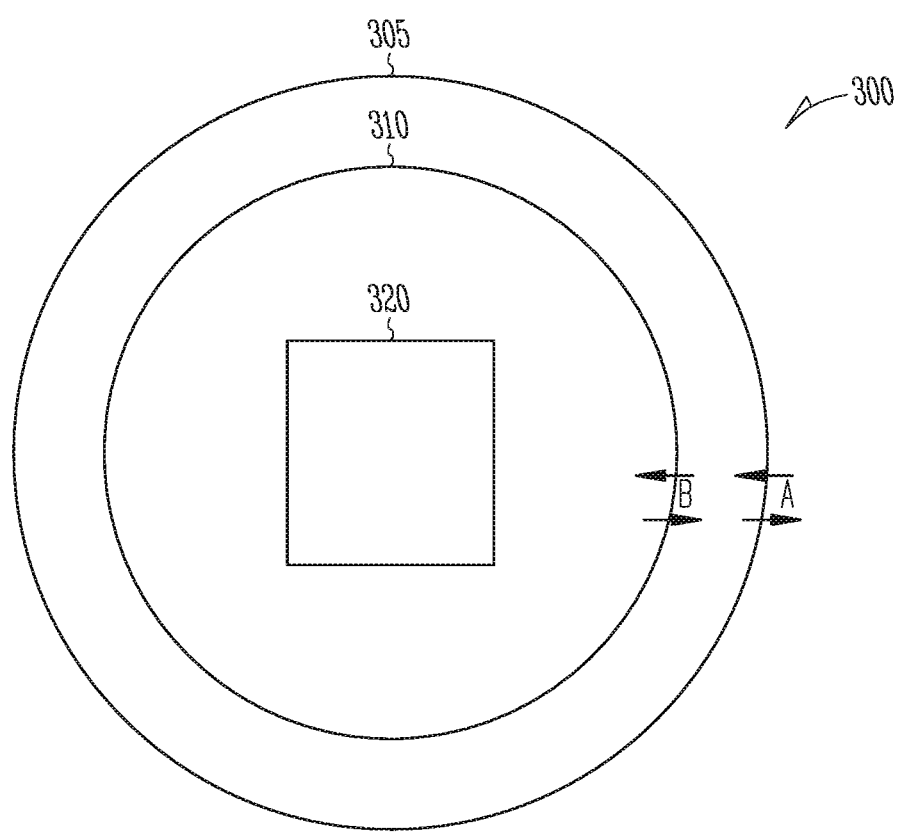
FIG. 3 is a schematic illustration of a method and system that triggers a barrier response based on detected activity in succession at two specified geographic boundaries.

FIG. 3 is a schematic illustration of a two-boundary system. In this example, when boundary 305 is crossed, and then in succession boundary 310 is crossed, a barrier system response at the building destination 320 can be triggered if a specified activation criterion is also satisfied. For example, when the first boundary and second boundary are crossed in succession within a period of time that is below a threshold, a barrier system response is triggered. This can avoid inadvertent barrier system response when a boundary is crossed, and then a long time later the second boundary is crossed, which could happen for example when a user drives a circuitous route, walks a dog, or otherwise follows a path that is not directionally consistent. In another example, the activation criteria can include a direction, speed, or velocity at the first boundary, second boundary, or both, or as determined by crossing of the first and second boundaries.

Similarly, on departure, a departure barrier system response can be triggered when the second boundary 310 is crossed and then the first boundary 305 is crossed, and one or more activation criteria are satisfied. As described above, the activation criteria can include a threshold time between crossings, velocity, direction, speed, or other criteria.

Figure 4:
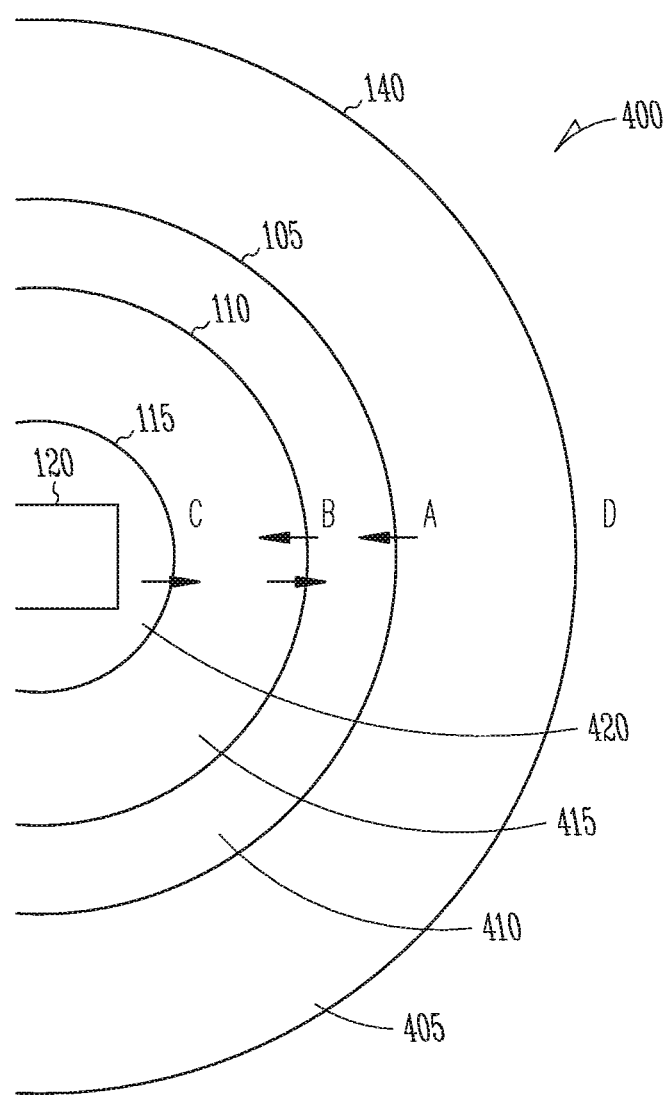
FIG. 4 is a schematic illustration of a method and system that triggers a barrier response based on detected activity at a specified geographic boundary, and deactivates a location-tracking feature at a distant boundary.

FIG. 4 is a schematic illustration of a method and system that triggers a barrier response based on detected activity at a specified geographic boundary, and deactivates a location-tracking feature at a distant boundary. A fourth boundary 140 is established outside the first boundary 105. The fourth boundary 140 can be a relatively great distance, e.g., five miles, from the user's home or workplace 120. (The schematic of FIG. 4 is not necessarily drawn to scale.) When the fourth boundary 140 is crossed in an outward direction, such as during departure, a location-monitoring feature is switched to a different mode. This can be desirable, for example, to conserve battery in a mobile device. Depending on the phone's capabilities, tracking the location on a granular level at all times could require excessive battery utilization. In an example, a mobile device can be switched from a high-fidelity location-monitoring mode, e.g., high-fidelity GPS, to a low-fidelity location-monitoring mode, e.g. low-fidelity GPS, when the mobile device moves outward across the fourth boundary 140. When the device later moves toward the destination 120 and re-crosses the fourth boundary 140, high fidelity location monitoring can be switched on to enable accurate sensing of crossing of the first geographic boundary 105.

The areas defined by the boundaries can define zones, which can affect the behavior of a mobile device or control system. For example, a first zone 400 beyond the fourth boundary 140 can be a low-fidelity monitoring zone, a second zone 405 between the fourth boundary 140 and the third boundary 105 can be considered a high-fidelity monitoring zone, a third zone 410 between the first boundary 105 and the second boundary 110 can be an armed-for-arrival zone, a fourth zone 415 between the second boundary 110 and the third boundary 115 can be an armed-for-departure zone, and a fifth zone 420 within the third boundary can be a "present" zone where a user or mobile device is present at the destination 120 (home, workplace, or other location.) In an example, the state of a mobile device is controlled based upon the zone in which it is determined to reside using location information, physical sensors, a wireless connection, or other information. The state can also be determined using rules, such as the present zone in combination with the most recent boundary crossing. For example, a device in the third zone 410 could be switched into an armed-for arrival state (in which crossing of second boundary 110 or movement into zone four triggers a barrier system response) only when the most recent boundary crossing was across the first boundary (i.e. coming from the second zone 405), suggesting pending arrival, as opposed across the second boundary (i.e. coming from third zone 410), suggesting recent departure.

In some examples, a location-monitoring feature can be switched or even turned off when a mobile device is within the third boundary 115, i.e. in the third zone 410. For example, an application running on a mobile device can be reasonably confident that the phone is within the user's residence if it is able to directly connect to a local wireless network (e.g., WiFi, Zigbee, Bluetooth), or connect to a specific device such as a garage door opener or gate opener over local wireless connection. In such a case, the application can turn off GPS, or switched to low fidelity mode, to preserve battery. When the application ceases to have a direct WiFi connection, then the phone application can temporarily switch to high-fidelity GPS monitoring in order to track the user's position within the geofences surrounding the property.

Figure 5:
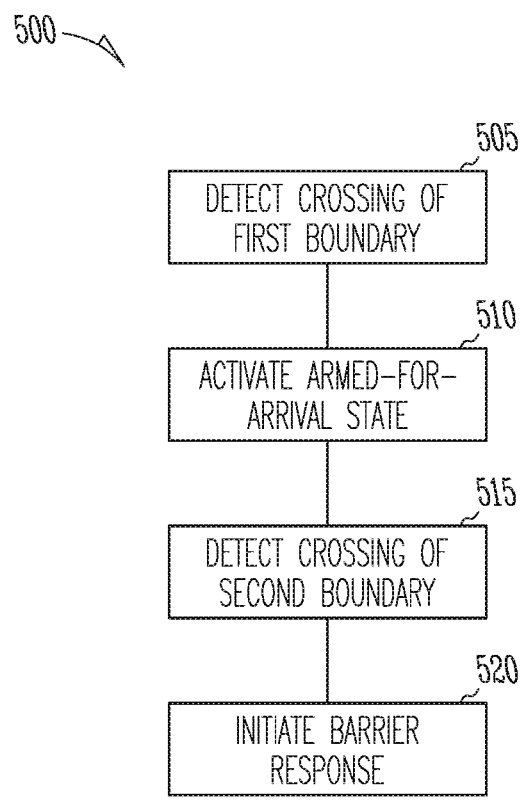
FIG. 5 is a flow chart illustration of a method of operating a barrier control system that includes initiating a barrier response based on detection of a crossing a first boundary and a second boundary.

FIG. 5 is a flow chart illustration of a method 500 of operating a barrier control system that includes initiating a barrier response based on detection of a crossing a first boundary and a second boundary. At step 500, a crossing of a first boundary is detected. The crossing of the first boundary can be detected, for example, when a connection to a local wireless network is lost or falls below a predetermined threshold, or when a physical sensor is activated, or when a connection to a second wireless network (e.g. at a barrier that is displaced from a residence) is detected, or using location information, such as GPS or geofence information. In an example, step 500 can be detecting a crossing of the first boundary 105 in FIG. 1A, 1B, 1C, 2 or 4, e.g. from the second zone 405 to the third zone 410 in FIG. 4. In an example, step 500 can include detecting, when a mobile device is in an unarmed state, crossing of the first boundary 105. At step 510, an armed-for-arrival state is activated. At step 515, a crossing of a second boundary is detected. At step 520, a barrier response is initiated. In an example, the barrier response includes, for example, opening a gate or door. Other types of response are also possible, such as turning on a light or unlocking a door. A similar process can be followed on departure, e.g. a boundary crossing, an armed-for-departure state is activated, another boundary crossing is detected, and a barrier system response such as closing a door or gate or locking a facility is triggered.

Figure 6:
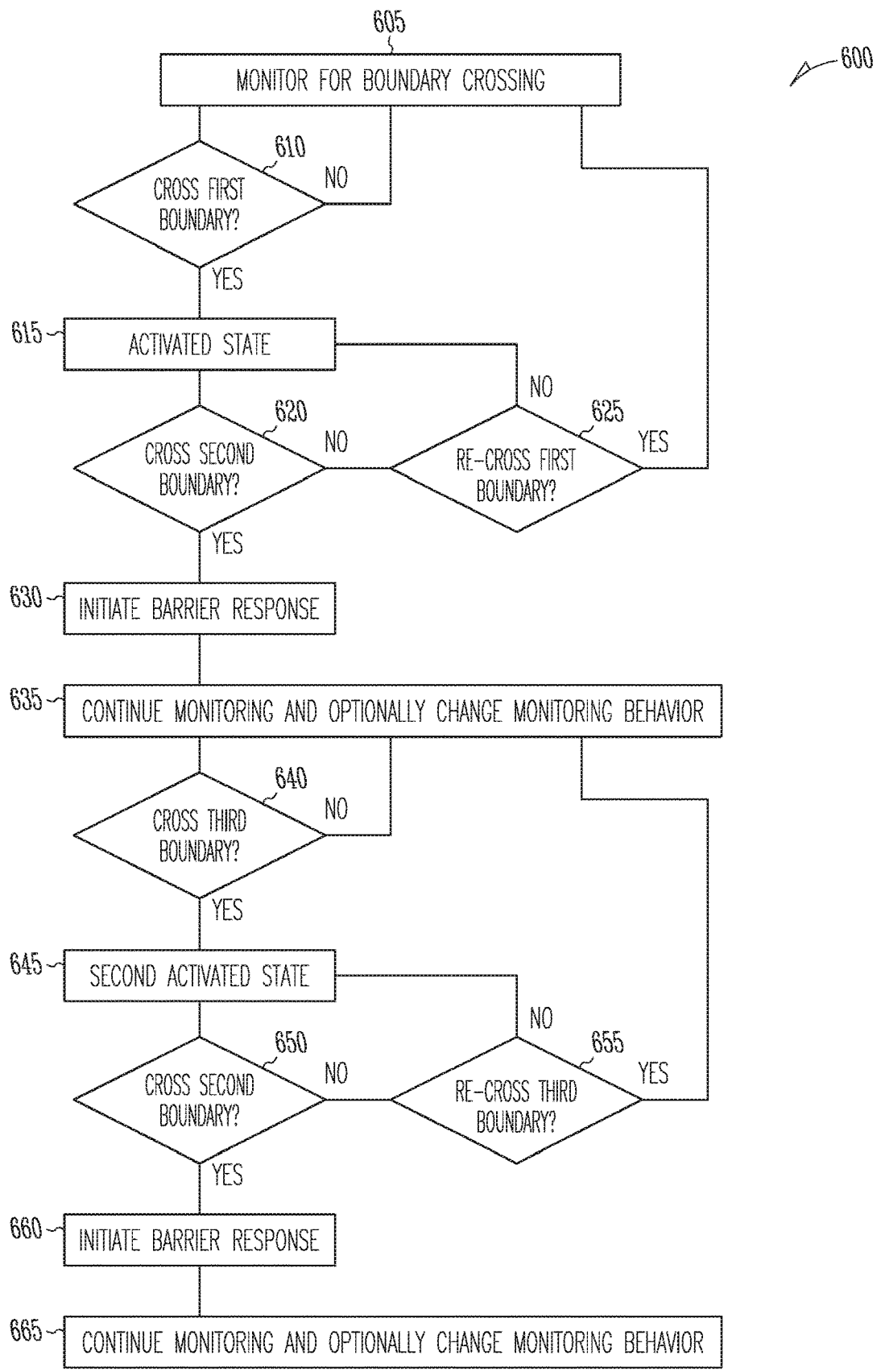
FIG. 6 is a flow chart illustration of a method of operating a barrier control system that includes detecting boundary crossings and initiating a barrier system response based on the boundary crossings.

FIG. 6 is a flow chart illustration of a method 600 of operating a barrier control system that includes detecting boundary crossings and initiating a barrier system response based on the boundary crossings. Step 605 includes monitoring for a boundary crossing. A boundary crossing can be detected, for example, using GPS or geofence information, connection to a local wireless network, or from activation of a physical sensor system. In an example, step 605 includes monitoring for crossing of the first boundary 105 in FIG. 1A, 1B, 1C, 2 or 4. At step 610, if the first boundary is not crossed, the process returns to step 605 and monitors location or sensor information to detect a boundary crossing. In an example, the monitoring at step 605 can also detect crossing of another boundary (e.g. the fourth boundary 140 in FIG. 4) and change a monitoring feature (e.g. switch from high fidelity GPS to low fidelity GPS) if a crossing of the addition boundary (i.e. fourth boundary 140) is detected.

When, at step 610, a crossing of the first boundary is detected, a state, such as a state of application running on a mobile device, can be set to an activated state. In an example, an armed-for-arrival state is activated (for example, as discussed in reference to FIG. 1D), and a system or mobile device monitors for another boundary crossing.

At step 620, if the second boundary is not crossed, the process cycles to step 625 to check for a first boundary crossing. If the first boundary is not crossed, the process returns to step 615, and the state remains active (e.g., a mobile device remains in armed-for-arrival state). At step 625, if the first boundary is crossed, the process returns to step 605, and, for example, the state can be deactivated, e.g., an application state in a mobile device is switched to unarmed.

When, at step 620, a second boundary crossing is detected, the process moves to step 630 and a barrier response is initiated. The barrier response can include, for example, opening a door, gate or other barrier. Other types of responses are also possible, such as turning on a light, unlocking a door or facility.

At step 635, monitoring is continued. In addition, monitoring behavior can optionally be changed. For example, when a mobile device is determined to be in zone 420 in FIG. 4, a location-monitoring feature such as GPS can be switched to low-fidelity or turned off.

Step 640 can include monitoring for a departure event as indicated by a boundary crossing. For example, when a mobile device is in the fifth zone 420, the mobile device or a networked system can monitor for crossing of the third boundary 115. In an example, a crossing of the third boundary can be detected when a connection to a local wireless network is lost, or falls below a threshold value. When, at step 640 crossing of a third boundary is not detected, the process returns to step 635 and monitoring continues.

When, at step 640, a crossing of a third boundary is detected, the process moves to step 645, and a mobile device or networked system is set to an activated state. In an example, the activated state is an armed-for-departure state as discussed in reference to FIG. 1C.

At step 650, if the second boundary (e.g. boundary 110 in FIGS. 1A-1D, 2, and 4) is not crossed, the process optionally can move to step 655, checks for crossing of the third boundary (e.g. returning home as evidenced by reconnection to a WiFi system). If a crossing of the third boundary is detected, the process returns to step 635. If a crossing of the third boundary is not detected, the device or system remains in the activated state.

When, at step 650, a crossing of the second boundary is detected (for example, as indicated by movement from the fourth zone 415 across the second boundary 110 into the third zone 410 in FIG. 4), a barrier system response is initiated. The response can include, for example, closing a door, gate, or other barrier. Other responses are also possible, such as turning off a light, locking a door or facility. In some examples, the barrier control barrier system response at steps 630 and 660 can involve responses that do not actually include moving a barrier. In other words, the example process can be applied to other types of control systems beside barrier control systems.

At step 665, monitoring is continued and monitoring behavior is optionally changed. In an example, step 665 can include returning to step 605, e.g. monitoring for an arrival event after departure has been completed or confirmed.

Figure 7:
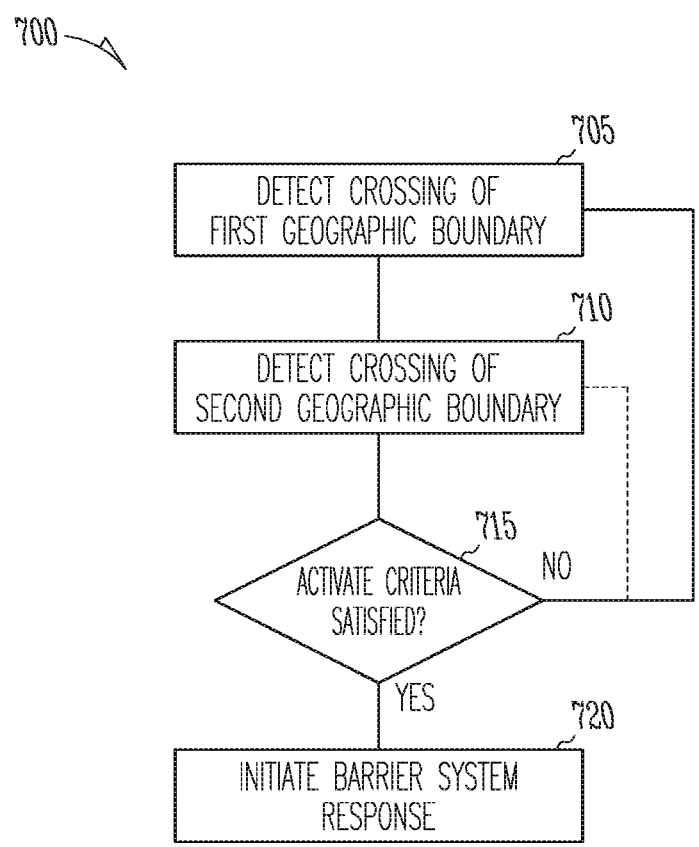
FIG. 7 is a flow chart illustrating a method of operating a barrier control system that includes detecting first and second boundary crossings and, when an activation criterion is satisfied, initiating a barrier system response.

FIG. 7 is a flow chart illustrating a method 700 of operating a barrier control system that includes detecting first and second boundary crossings and, when one or more activation criteria is satisfied, initiating a barrier system response. At step 705, a crossing of a first geographic boundary is detected. In an example, the crossing is detected from location information from a mobile device, using an application on the mobile device, or on a network system that receives the location information. The crossing of the first geographic boundary can be detected, for example, based upon crossing of a geofence as determined from GPS, cellular, wireless network connectivity, or other information.

At step 710, a crossing of a second geographic boundary is detected. In an example, the crossing of the second geographic boundary is detected using a geofence or other location information, or based upon activation of a physical sensor system, or based upon connection status or strength with a local wireless network.

At step 715, satisfaction of one or more activation criteria is evaluated. The activation criteria can include, for example, the detection of crossing of the first geographic boundary and detection of crossing of the second geographic boundary occurring within a time period that is less than a threshold. For example, an activation criterion can include crossing both boundaries within thirty seconds, or within one minute, or within five minutes. In an example, the time threshold is preset. In some examples, the time threshold can be user-programmable to allow customization for a particular set of boundaries or installation conditions. In some examples, the activation criteria can include a direction, speed, or velocity of a mobile device as it crosses the first geographic boundary or second geographic boundary or both. These direction/speed/velocity criteria can avoid unwanted barrier system responses when, for example, a boundary in crossed by a person walking as opposed to driving, or incidentally crossing a boundary on a route that does not lead to a barrier system destination (e.g. on a meandering curved road.)

If the activation criteria are not satisfied, the process returns to step 705 or step 710. For example, when the activation criteria require two crossing in a time period below a threshold, the process returns to step 710. When the activation criteria require a direction, speed, or velocity at the second boundary crossing, the process can return to step 705, or alternatively to step 710 if additional criteria are also required.

When, at step 715, the activation criteria are satisfied, a barrier system response is initiated at step 720.

Figure 8:
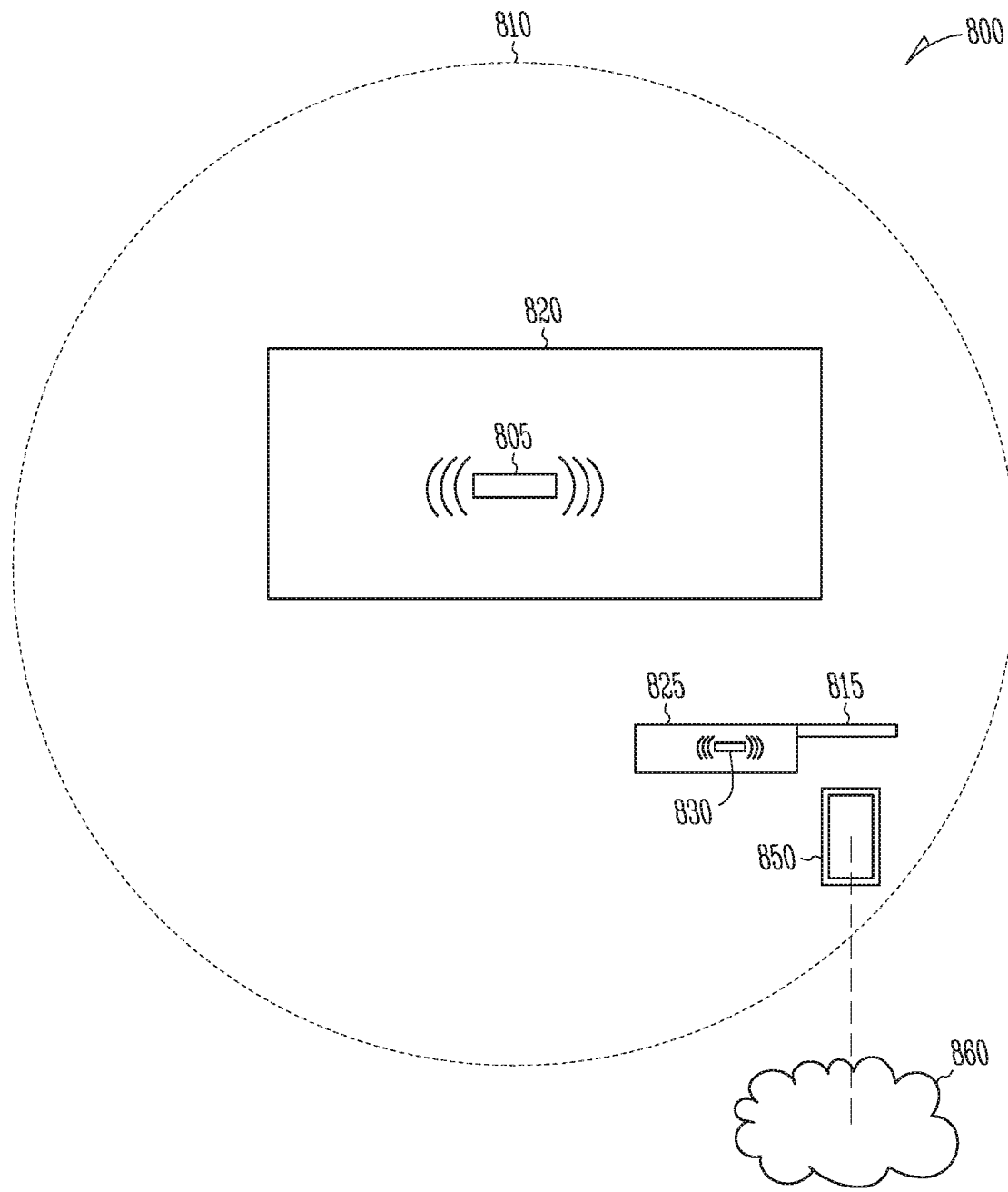
FIG. 8 is a schematic illustration of an example barrier control system.

FIG. 8 is a schematic illustration of an example barrier control system. A first wireless device 805 such as a wireless router or access point can be located within or near a place 820 such as a home or workplace. A geographic boundary 810 can be defined by an extend of a wireless signal transmitted from the first wireless device 805. A connection between the first wireless device and a mobile device 850 such as a handheld device (e.g., cellular phone) or vehicle) can be detected, indicating a crossing of the geographic boundary, i.e. arrival at the destination place 820. A barrier 815 can be controlled by a local controller (i.e. processor) 825 that is coupled to the barrier 815. The local controller 825 can include a second wireless device 830 that can optionally communicate with the first wireless device 805 to receive operating commands or convey or receive information. The first wireless device, second wireless device, and mobile device can also be connected to a remote network 860 such as the internet.

In an example, the second wireless device 830 can emit a second local wireless signal (e.g., Bluetooth, WiFi, Zigbee) that can define a second geographic boundary (not shown) around the second wireless device 825 or act as a physical sensor. For example, when a connection is detected between the second wireless device 830 and a mobile device, a crossing of a geographic boundary (e.g. arrival at the gate) can be detected.

Figure 9:
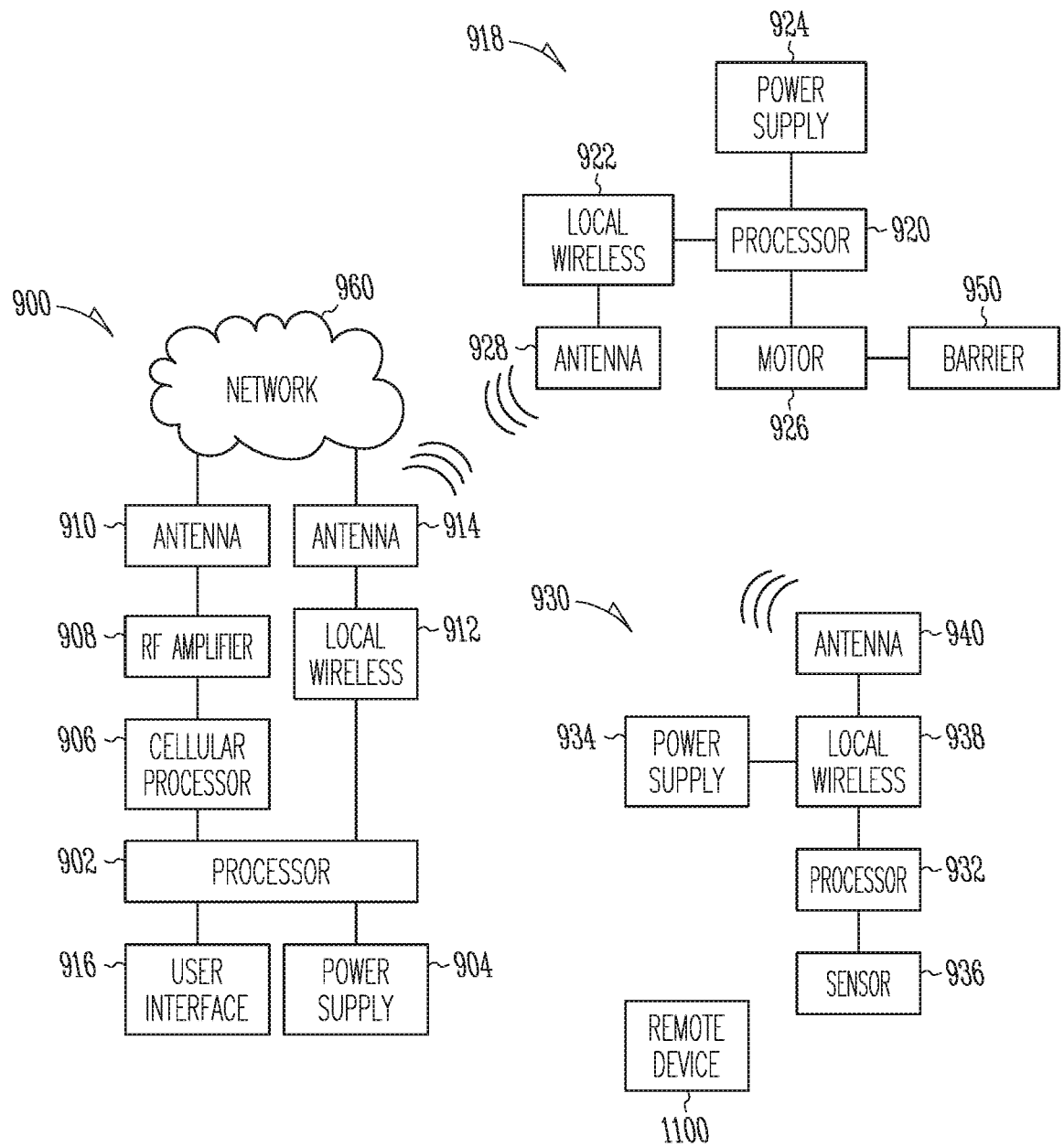
FIG. 9 is a schematic illustration of an example barrier control system and a mobile device.

FIG. 9 is a schematic illustration of an example barrier control system that can include a wireless unit 900, a barrier control unit 918, a physical sensor unit 930, and a mobile device 1100. The wireless unit 900 can include a processor 904 coupled to a power supply 904 and an optional user interface 916. The processor 902 can be coupled to a cellular processor 906 that can be coupled to an RF amplifier 908 that is coupled to send wireless signals through an antenna 910. The processor 902 can also be coupled to a first local wireless unit 912 (e.g. WiFi, Zigbee, Bluetooth) that can include wireless control circuitry and an RF amplifier, and can be configured to send wireless signals through an antenna 914. The cellular processor 906 and local wireless unit 912 can connect to a remote network such as the internet 960 through wire connections (not shown) or through wireless connections. In an example, the wireless unit 900 can include or be a wireless router in a workplace or residence. The barrier control unit 918 can include a barrier control unit processor 920 that can be coupled to a power supply 924 and to second local wireless unit 922, which can be coupled to an antenna 928. The second wireless control unit 922 can communicate with the first wireless control unit 912 over a local network, such as WiFi, Zigbee, or Bluetooth. The processor can be coupled to a motor 926 that can be coupled to a movable barrier 950 through linkages, gears, or other mechanical machines (not shown). Control signals can be sent from the barrier control unit processor 920 to the motor 926 to move the barrier 950. The physical sensor unit 930 can include a processor 932 coupled to a power supply 934 and a sensor 936. The sensor 936 can, for example, include a motion detection system, a laser or photobeam sensor system, a photocell sensor, a magnetic sensor, or a driveway alarm. The physical sensor unit 930 can also include a sensor local wireless control unit 938 that is coupled to an antenna 940. The physical sensor unit 930 can communicate information from the sensor 936, e.g. a sensor activation event, directly over a wireless network or through the internet 960 to the wireless unit 900, to the remote device 1100 or to the barrier control unit 918.

In some examples, the wireless control units 912, 922, 938 can be integrated into the processors 902, 920 and configured to control delivery of energy to the respective antennas. The physical sensor unit 930 and motor control unit can alternatively or additionally be coupled to cellular communication units (not shown) that can be configured to communicate through a cellular network to a remote network such as the internet.

Instructions to execute methods such as those illustrated and described in reference to FIGS. 5-7 can be executed on one or more of the processors 902, 920, 930, or a processor on the remote device 1100. The methods can be executed on a single processor, or on multiple processors working together and communicating over one or more wired or wireless networks. For example, the methods can be executed by a processor that is local to the barrier operator (e.g., integrated with the barrier operator or connected via a local wireless network), at a remote location (e.g., connected to the battier operator through the internet), or a component of a mobile device, or coupled to a mobile device.

Figure 10:
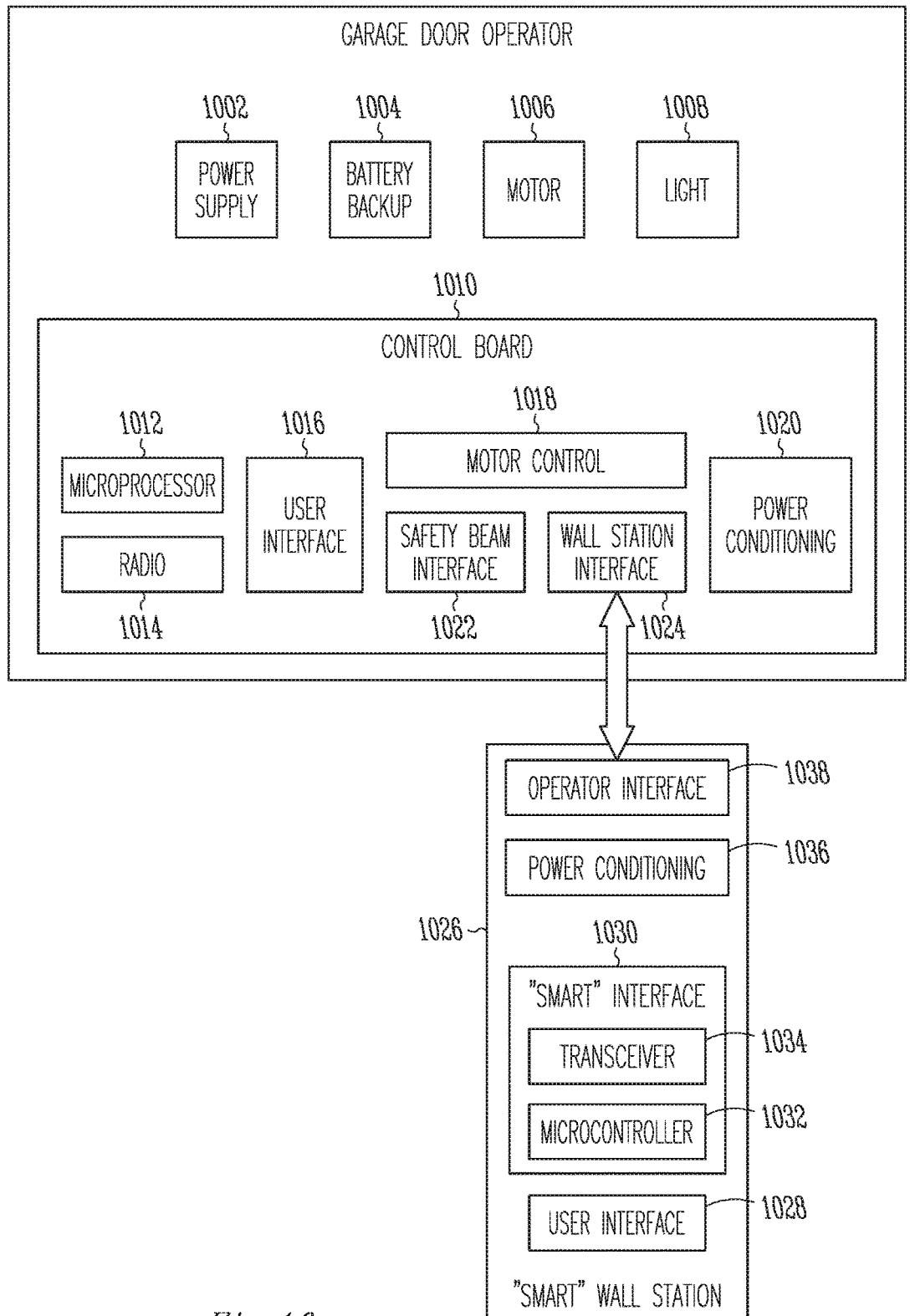
FIG. 10 is a schematic illustration of an example garage door operator.

FIG. 10 is a schematic illustration of an example barrier operator 1000 that can, for example, be a garage door opener. The operator 1000 can include a power supply 1002, battery backup 1004, motor 1006 and light 1008 that can be controlled through a control board 1010. The control board can include a microprocessor 1012 that can be coupled to a radio unit 1014, which can for example include a cellular transceiver or local wireless technology (e.g. WiFi, Zigbee, Bluetooth) and can communicate with a handheld remote control (not shown) the remote device 1100, the wireless unit 900 shown in FIG. 9 or any of the other wireless local wireless shown in FIG. 9.

A user interface 1016 can be coupled to the processor to allow for user inputs to program or control the barrier operator 1000. The user interface 1016 can include buttons, a touch screen interface, voice recognition technology, or other user input functionality. The barrier operator 1000 can also include a motor control circuit 1018 that can receive instructions from the microprocessor 9012, or directly from the user interface. A power conditioning unit 10120 can condition AC power for use by the motor 1006. The motor control circuit 1018 can send control the motor by delivery of conditioned power or battery power to the battery to power the motor 1006 and move a barrier such as a garage door (not shown). The control board 1010 can also include a safety beam interface 1022 that can communicate via a wired or wireless connection with a safety beam sensor (not shown). The microprocessor 1012 or motor control unit 1018 can receive signals from the safety beam interface and interrupt operation of the motor 1006 when an obstruction is detected by the safety beam sensor.

The control board 1010 can also include a wall station interface 1024 that can communicate via wired or wireless connection with a wall station 1026 that can send control instructions to the barrier operator 1000 through the wall station interface. While described for simplicity as a "wall station", the components therein can alternatively be integrated into a handheld device, tabletop device, or other form factor. The wall station 1026 can include a user interface 1028 such as a touch screen, buttons, or voice recognition software. The user interface can be coupled to a "smart" interface 1030 that can include a microcontroller 1032 (i.e. processor) and transceiver 1034 which can, for example, communicate over a wireless network to receive commands from other devices such as a smartphone, tablet, or other handheld device. The wall station 1026 can also include power conditioning circuitry to power the microprocessor and other components, and an operator interface 1038 that can communicate with the wall station interface via a wired or wireless connection, e.g. to send "open" or "close" commands to open or close the barrier.

Figure 11:
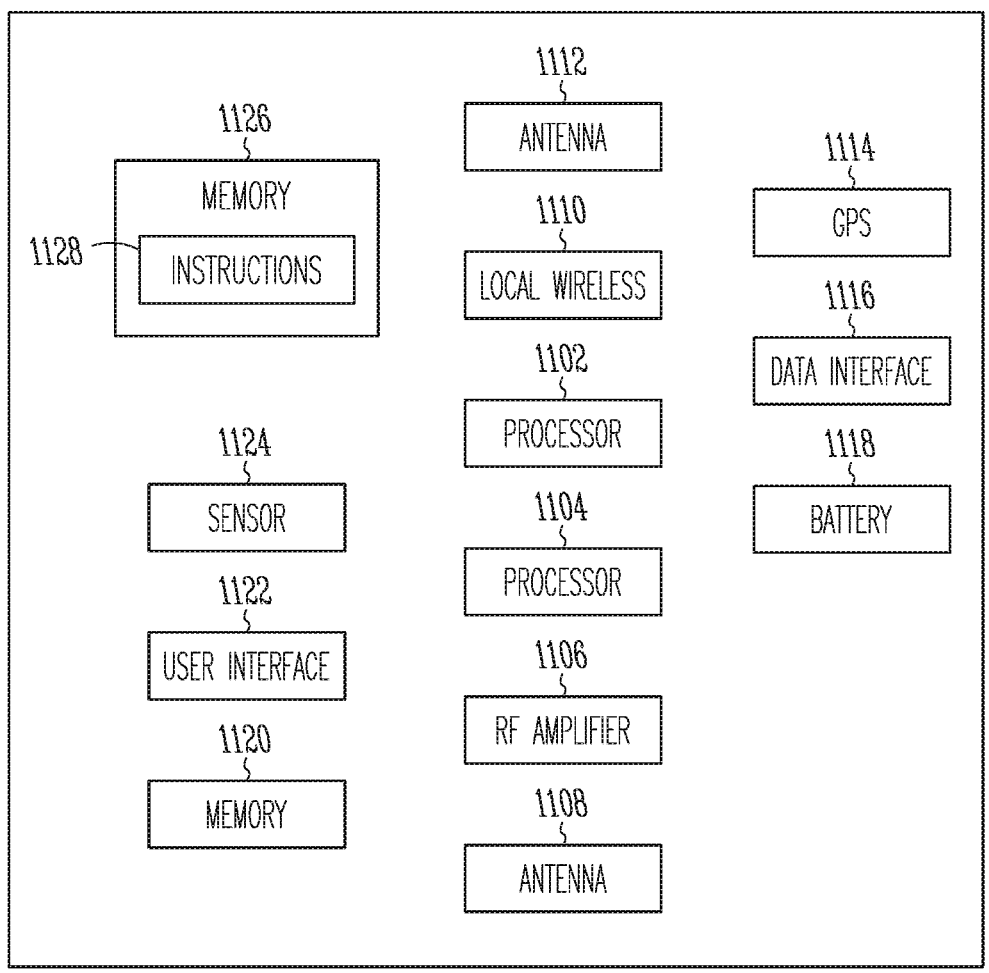
FIG. 11 is a schematic illustration of an example mobile device.

FIG. 11 is a schematic illustration of an example mobile device 1100. A main processor 1102 can be coupled to a specialized communication processor such as a cellular processor 1104, which can be coupled to an RF amplifier 1106 that is coupled to an antenna 1108. The processor 1102 can include a local wireless circuit 1110 that can be coupled to an antenna 1112, which in combination can be used to send signals over a local wireless network (e.g. WiFi, Zigbee, or Bluetooth.) The processor 1102 can also be coupled to a GPS circuit 1114 that can, for example, sense position information and convey the position information to the processor 1102. The mobile device 1100 can also include a data interface 1116 (e.g. US-B or Lightning), a rechargeable battery 1118, non-volatile storage 1120 (e.g. flash), a user interface 1122 (e.g. touchscreen or microphone/voice recognition), a sensor 1124 (e.g. accelerometer or proximity sensor), and memory containing instructions 1128. The instructions can include, for example, instructions to execute methods for controlling a barrier using location information received from the GPS circuit 1114, such as the various methods described herein, including but not limited to the methods illustrated and described in reference to FIGS. 5-7.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with U.S. 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A processor-implemented method of operating a barrier control system for a stationary building, the method comprising:
   electronically monitoring sensor or transceiver information to detect a crossing of a first geographic boundary;
   responsive to detection of a crossing of the first geographic boundary, electronically initiating a first barrier system response using the processor;
   determining a trajectory of a mobile device;
   monitoring a connection status between the mobile device and a local wireless network;
   responsive to detection of a determined trajectory from the first geographic boundary to a second geographic boundary and detection of a connection between the mobile device and a local wireless network, electronically initiating a second barrier system response using the processor, wherein electronically initiating the second barrier system response occurs in response to determining that a time of day corresponds to a specified time of day.

2. The processor-implemented method of claim 1, wherein the first barrier system response is a wake up activation.

3. The processor-implemented method of claim 1, wherein the second barrier system response triggers an action including opening a door, unlocking a facility, or turning on a light.

4. The processor-implemented method of claim 1, wherein electronically initiating the second barrier system response is performed responsive to detection, of a crossing of the second geographic boundary.

5. The processor-implemented method of claim 4, wherein electronically initiating the second barrier system response is performed responsive to determining that the crossing of the second geographic boundary occurs within a time period after the crossing of the first boundary that is less than a threshold.

6. The processor-implemented method of claim 1, wherein electronically monitoring to detect the crossing of the first geographic boundary includes electronically monitoring to detect whether the mobile device crosses a geofence.

7. The processor-implemented method of claim 1, further comprising electronically changing a location-monitoring feature when the mobile device connects to the local wireless network.

8. A barrier control system for a stationary building, the barrier control system comprising:
   a motorized barrier operator configured to open and close a barrier;
   a processor configured to send signals to the motorized barrier operator, the processor executing instructions to:
   electronically monitor sensor or transceiver information to detect a crossing of a first geographic boundary;
   responsive to detection of a crossing of the first geographic boundary, send a command to the motorized barrier operator to initiate a first response;
   determine a trajectory of a mobile device;
   monitor a connection status between the mobile device and a local wireless network;
   responsive to detection of a determined trajectory from the first geographic boundary to a second geographic boundary and detection of a connection between the mobile device and a local wireless network, send a command to the motorized barrier operator to initiate a second response, wherein the second response is initiated in response to a determination that a time of day corresponds to a specified time of day.

9. The barrier control system of claim 8, wherein the first response is a wake up activation.

10. The barrier control system of claim 8, wherein the second response opens or unlocks the barrier.

11. The barrier control system of claim 8, wherein the second response is initiated responsive to detection of a crossing of the second geographic boundary within a time period after the crossing of the first boundary that is less than a threshold.

12. The barrier control system of claim 8, wherein to monitor to detect the crossing of the first geographic boundary, the instructions further cause the processor to monitor to detect whether the mobile device crosses a geofence.

13. A non-transitory computer readable medium comprising instructions that, when executed by a processor of a device, causes the device to perform operations to:
   electronically monitor sensor or transceiver information to detect a crossing of a first geographic boundary;
   responsive to detection of a crossing of the first geographic boundary, electronically initiate a first barrier system response;
   determine a trajectory of a mobile device;
   monitor a connection status between the mobile device and a local wireless network;
   responsive to detection, using the processor, of a determined trajectory from the first geographic boundary to a second geographic boundary and detection of a connection between the mobile device and a local wireless network, electronically initiate a second barrier system response, wherein the second barrier system response is initiated in response to a determination that a time of day corresponds to a specified time of day.

14. The computer readable medium of claim 13, wherein the first barrier system response is a wake up activation.

15. The computer readable medium of claim 13, wherein the second barrier system response triggers an action including opening a door, unlocking a facility, or turning on a light.

16. The computer readable medium of claim 13, wherein the second barrier system response is initiated responsive to detection, using the processor, of a crossing of the second geographic boundary.

17. The computer readable medium of claim 13, wherein the instructions that cause the processor to electronically monitor to detect the crossing of the first geographic boundary include instructions that cause the processor to electronically monitor to detect whether the mobile device crosses a geofence.

18. The computer readable medium of claim 13, wherein the instructions further cause the processor to electronically change a location-monitoring feature when the mobile device connects to the local wireless network.

* * * * *